(12) United States Patent
Werner

(10) Patent No.: US 7,614,383 B2
(45) Date of Patent: Nov. 10, 2009

(54) METHOD OF OPERATING A SPARK-IGNITION INTERNAL COMBUSTION ENGINE DURING WARM-UP

(75) Inventor: Matthias Werner, Stuttgart (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 12/150,683

(22) Filed: Apr. 30, 2008

(65) Prior Publication Data

US 2008/0245342 A1    Oct. 9, 2008

Related U.S. Application Data

(63) Continuation-in-part of application No. PCT/EP2006/010642, filed on Nov. 7, 2006.

(30) Foreign Application Priority Data

Jul. 29, 2005    (DE) .................. 10 2006 035 139
Aug. 11, 2005   (DE) .................. 10 2005 053 199

(51) Int. Cl.
F02B 17/00    (2006.01)
F02B 3/04     (2006.01)

(52) U.S. Cl. .................. 123/295; 123/299; 123/305
(58) Field of Classification Search .............. 123/295, 123/299, 305
See application file for complete search history.

(56) References Cited

U.S. PATENT DOCUMENTS 4,621,599 A * 11/1986 Igashira et al. ............... 123/300
6,659,073 B1 * 12/2003 Franke et al. ................ 123/299
7,204,228 B2 * 4/2007 Oechsle et al. .............. 123/299
7,370,628 B2 * 5/2008 Eves et al. ................... 123/295
7,404,390 B2 * 7/2008 Altenschmidt ............... 123/299
2006/0000440 A1 * 1/2006 Kohler et al. ................ 123/295

FOREIGN PATENT DOCUMENTS

| DE | 101 32 838 | 1/2002 |
| EP | 1 108 876 | 6/2001 |
| GB | 2 351 816 | 1/2001 |
| WO | WO 2004/072461 | 8/2004 |

* cited by examiner

Primary Examiner—Erick Solis
(74) Attorney, Agent, or Firm—Klaus J. Bach

(57) ABSTRACT

In a method for cold-running or warm-up operation of a spark-ignition, direct-injection 4-stroke internal combustion engine having an exhaust gas catalytic converter, wherein fuel is injected into the cylinders of the internal combustion engine by means of injectors and is externally ignited by means of spark plugs, in an intake stroke fuel injection a lean, combustible but non-ignitable lean mixture is produced in the cylinders, in a compression stroke fuel injection following the intake stroke injection, by a compression stroke fuel injection, a combustible and ignitable fuel/air mixture is formed in the combustible but non-ignitable lean mixture in the cylinders and, subsequently, in a stratified fuel injection which is close in timing to an ignition time, a rich fuel/air mixture is locally formed in the region of the spark plug and is then ignited by the spark plug so as to provide for rapid heat up of the cold exhaust gas catalytic converter with reliable combustion and smooth engine operation.

18 Claims, 2 Drawing Sheets

METHOD OF OPERATING A SPARK-IGNITION INTERNAL COMBUSTION ENGINE DURING WARM-UP

This is a Continuation-in-Part Application of pending International patent application PCT/EP2006/010642 filed Nov. 7, 2006 and claiming the priority of German patent application 10 2006 035 139.8 filed Jul. 29, 2006.

BACKGROUND OF THE INVENTION

The invention relates to a method for cold-running operation, that is during warm-up, of a spark-ignition direct-injection 4-stroke internal combustion engine.

In motor vehicles, in particular in passenger cars, spark-ignition, 4-stroke internal combustion engines, which are also referred to as Otto engines, are widely used. Such internal combustion engines are increasingly being provided with fuel injectors by means of which fuel is injected directly into the cylinders of the internal combustion engine. A fuel/air mixture is formed with fresh air which is sucked into the cylinder, and said fuel/air mixture is ignited at a predefined time by means of a spark plug in order to initiate a combustion process.

The exhaust gases which are produced contain pollutants which will not meet relevant regulations unless they are treated before they are discharged. Under certain operating conditions however, the fuel/air mixture is not completely burnt in the cylinders. The exhaust gas which is produced contains portions of hydrocarbons, carbon monoxide and nitrogen oxides, for the conversion of which into substances which are more compatible with the environment an exhaust gas catalytic converter is connected downstream in the exhaust gas system. The effectiveness of the exhaust gas catalytic converter depends on its operating temperature; it only starts to become effective above a certain threshold temperature, the so-called "light-off temperature".

After a cold start and during the subsequent cold-running operation, the mixture can only be prepared unsatisfactorily in the cold cylinders or combustion chambers of the internal combustion engine. The exhaust gas catalytic converter which is also still cold or not sufficiently warmed up cannot convert the high emissions of hydrocarbons and carbon monoxide which are produced, or can only convert them to an insufficient degree.

After a cold start occurs and in the subsequent cold-running operation, the objectives are to achieve both quiet running of the engine despite the cold engine components and to heat up the exhaust gas catalytic converter quickly. In conventional operating methods, the engine is for this purpose operated after the cold start with a rich mixture charge in order to ensure a sufficiently reliable combustion for an acceptable level of smooth operating performance. A late ignition time is aimed at, the late timing of which is, however, limited by the combustibility and also the operating noise of the engine. The rich mixture gives rise to high proportions of unburnt fuel in the exhaust gas, which can be used to heat the still cold exhaust gas catalytic converter. By adding secondary air to the exhaust gas, a thermal post-combustion can be obtained, the reaction heat of which accelerates the heating-up of the exhaust gas catalytic converter. It is, however, disadvantageous that it is necessary herefor to use an electrically operated secondary air pump or a secondary air charger as well as a plurality of electrical and pneumatic switching valves. The operation of these components has to be monitored, which is costly. And in any case, good emission values and smooth running of the engine are not achieved.

It is the principal object of the present invention to provide a method for cold-running operation of a spark-ignition 4-stroke internal combustion engine, in which method rapid heating of the exhaust gas catalytic converter is achieved in conjunction with a good level of smooth running and low emission values.

SUMMARY OF THE INVENTION

In a method for cold-running or warm-up operation of a spark-ignition, direct-injection 4-stroke internal combustion engine having an exhaust gas catalytic converter, wherein fuel is injected into the cylinders of the internal combustion engine by means of injectors and is externally ignited by means of spark plugs, in an intake stroke fuel injection a lean, combustible but non-ignitable lean mixture is produced in the cylinders, in a compression stroke fuel injection following the intake stroke injection, by a compression stroke fuel injection, a combustible and ignitable fuel/air mixture is formed in the combustible but non-ignitable lean mixture in the cylinders and, subsequently, in a stratified fuel injection which is close in timing to an ignition time, a rich fuel/air mixture is locally formed in the region of the spark plug and is then ignited by the spark plug so as to provide for rapid heat up of the cold exhaust gas catalytic converter with reliable combustion and smooth engine operation.

The fuel injector may be arranged in the center of the combustion chamber whereas the spark plug is arranged displaced to the side or, vice versa, the spark plug may be arranged in the center of the combustion chamber, whereas the injector is arranged displaced to one side.

Since the combustion speed rises as the air/fuel ratio drops, the rapid combustion of the rich mixture of the stratified charge which is formed from the third and second injections is concluded by the time the outlet valve opens. In the further course of the working stroke, the flame front of the combustion propagates into those regions of the combustion chamber in which the lean mixture of the intake stroke injection is present. The combustion speed decreases because of the high air/fuel ratio which is present here and is therefore not yet concluded when the outlet valve opens. As a result, very high exhaust gas temperatures are reached in the outlet duct and upstream of the exhaust gas catalytic converter which is connected downstream.

As a result of the combustion of the rich mixture of the stratified injections, a large quantity of carbon monoxide and a large quantity of hydrogen are produced, and these are post-oxidized in the expulsion phase together with still partially unburnt hydrocarbons from the lean regions as a result of the excess oxygen which is present.

The low air/fuel ratio which is present in the region of the spark plug permits a comparatively late ignition timing without adversely affecting the readiness to ignite. As a result, a high exhaust gas temperature can be generated since the late ignition time results in a late combustion of the major part of the mixture and a late end of combustion. These peripheral conditions, in conjunction with the high exhaust gas temperatures and the slight excess oxygen, promote post-oxidation of carbon monoxide, hydrogen and hydrocarbon in the exhaust gas system, said post-oxidation occurring as thermal post-combustion both in the outlet duct and in the exhaust manifold as well as in the exhaust gas catalytic converter connected downstream. The reaction heat which is released in the process brings about a further rise in the exhaust gas temperature. The high exhaust gas temperature and the oxidation of carbon monoxide and hydrocarbon in the catalytic converter itself ensure accelerated heating of the exhaust gas catalytic converter, which as a result reaches its light-off temperature after only a few seconds.

The intake stroke injection is preferably carried out in such a way that an at least approximately homogenous fuel/air mixture is produced in the cylinder. Unavoidable condensation amounts of fuel on cold engine components are reduced, while uniform propagation of the flame front during the subsequent combustion is ensured. In this context, a preferred air/fuel ratio of approximately 1.6 has proven expedient for the first method, and a preferred air/fuel ratio between 2 and 3 has proven expedient for the second method. The compression stroke injection is preferably carried out in such a way that, within the homogenous fresh charge, a mixture cloud which is relatively rich compared thereto is formed and is embedded in the lean homogenous fuel/air mixture. The relatively rich mixture cloud preferably has an air/fuel ratio of less than or equal to 1.0, as a result of which a high readiness to ignite and a locally limited rapid combustion are ensured.

The overall air/fuel ratio which is averaged over the cylinder volume and is obtained from all the injections is advantageously in a range of inclusively approximately 1.0 to greater than 1.0, and is in particular between inclusively 1.0 and inclusively 1.05. In order to heat up the exhaust gas catalytic converter which is connected downstream and the thermal post-combustion which is provided for this purpose in the exhaust gas line, there is sufficient oxygen present, as a result of which an additional supply of air by means of a secondary air pump or secondary air charger is no longer necessary. The structural complexity and expenditure on open-loop and closed-loop control are reduced.

In one expedient development of the first method, the intake stroke injection and/or the compression stroke injection and/or the stratified injection are carried out as a multiple injection, in particular as a double injection or triple injection. In one expedient development of the second method, the intake stroke injection and/or the compression stroke injection are carried out as a multiple injection, in particular as a double injection or triple injection. The stratified injection comprises at least one individual injection which has a quantity which corresponds essentially to the minimum injection quantity of the injector. By means of suitable injectors, for example of a piezo design, the fuel quantities which are to be respectively injected during the abovementioned three injections are divided into partial quantities which in themselves are introduced into the cylinder within a few milliseconds. The homogenization of the intake stroke injection, the shape and the stratification of the mixture cloud produced by the compression stroke injection and the ignition conditions at the spark plug can be definitively adjusted during the stratified injection.

The time of the intake stroke injection and that of the compression stroke injection are advantageously coupled to the crank angle of the crankshaft and therefore in terms of timing to the respective position, in which case, in the first method, the intake stroke injection at a crank angle of approximately 260° before the top dead center has proved expedient and the compression stroke injection at a crank angle of approximately 30° before the top dead center has proven expedient. In the second method, a crank angle of 330° to 200° before the top dead center has proven expedient for the intake stroke injection, and a crank angle of 150° to 90° before the top dead center has proven expedient for the compression stroke injection.

The stratified injection of the first method is, in contrast, preferably adapted to the ignition time. When there are different load conditions and, in particular, rotational speed conditions, the ignition time is changed and with it the time of the stratified injection is also changed. It is ensured that even when there are different ignition times the stratified injection which is matched thereto ensures reliable ignition and combustion of the charge of the cylinder. For the stratified injection of the second method, a crank angle of 50° to 10° before the top dead center has proven expedient, in which case the ignition time occurs at a crank angle of 0° to 40° after the top dead center.

In order to produce the general conditions, described above, of the first method for rapid heating of the catalytic converter, the ignition timing is expediently after top dead center, and in particular in a crank angle range of 0° to 35°, preferably of 15° to 30° after the top dead center. The end of injection of the stratified injection expediently near the ignition and preferably between inclusive 0° and 10° crank angle before the ignition time. Rapid heating of the exhaust gas catalytic converter accompanied by reliable ignition and combustion can be achieved.

In a preferred development, the injection quantities of the compression stroke injection and/or of the stratified injection are open-loop or closed-loop controlled by means of a control unit as a function of the operating temperature reached in the exhaust gas catalytic converter. Likewise, it may be expedient to perform open-loop or closed-loop control of the respective times. As the temperature of the exhaust gas catalytic converter rises, and the catalytic converter begins to be effective, the exhaust gas emissions are minimized and the overall efficiency of the internal combustion engine is improved.

Exemplary embodiments of the method according to the invention are respectively explained in more detail below with reference to the accompanying drawings.

DESCRIPTION OF A PARTICULAR EMBODIMENT

Figure 1:
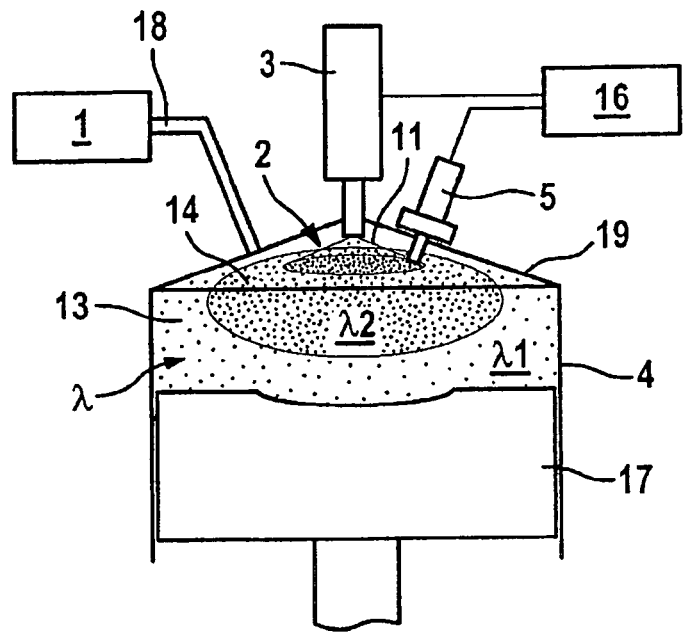
FIG. 1 is a schematic illustration of an internal combustion engine cylinder with an injector, a spark plug, a control unit and an exhaust gas catalytic converter, wherein the cylinder is filled with a fuel/air mixture differently in different regions according to a first method according to the invention.

FIG. 1 is a schematic illustration of the detail of a region of a cylinder 4a spark-ignition, direct-injection 4-stroke internal combustion engine. The first embodiment of the method according to the invention is shown using the example of the cylinder 4 shown here. The internal combustion engine may have one or more cylinders 4, each with a piston 17 which is moved cyclically up and down therein. The cylinder 4 is closed off in its longitudinal direction at the end opposite the piston 17 by a cylinder head 19, its interior being bounded in the opposite direction by the piston 17. The up and down movement of the piston 17 and control times, coupled thereto, of inlet valves and outlet valves (not illustrated) provides for a total of four strokes of the method (described in more detail in conjunction with FIG. 2) of the internal combustion engine, said strokes following one another in a cyclical sequence.

In order to inject fuel 2 into the cylinder 4, an injector 3 is provided which is activated by means of a schematically indicated control unit 16. The fuel 2 which is injected into the cylinder 4 forms, together with fresh air volume which is sucked in an intake stroke 6 (FIG. 2), a fuel/air mixture which is ignited at a suitable time by a spark plug 5 which is arranged in the cylinder head 19. According to the schematic illustration in FIG. 1, in addition to the injection by the injector 3, the ignition by the spark plug 5 is also controlled by means of the control unit 16. The ignition brings about combustion of the fuel/air mixture located in the cylinder 4. The exhaust gas which is produced hereby is conducted out of the cylinder 4 through an exhaust gas duct 18 via one or more outlet valves (not illustrated) and is passed through an exhaust gas catalytic converter 1 for post-treatment. The exhaust gas catalytic converter 1 can be of any desired suitable design and in the exemplary embodiment shown it is a three-way end-wall catalytic converter.

Figure 2:
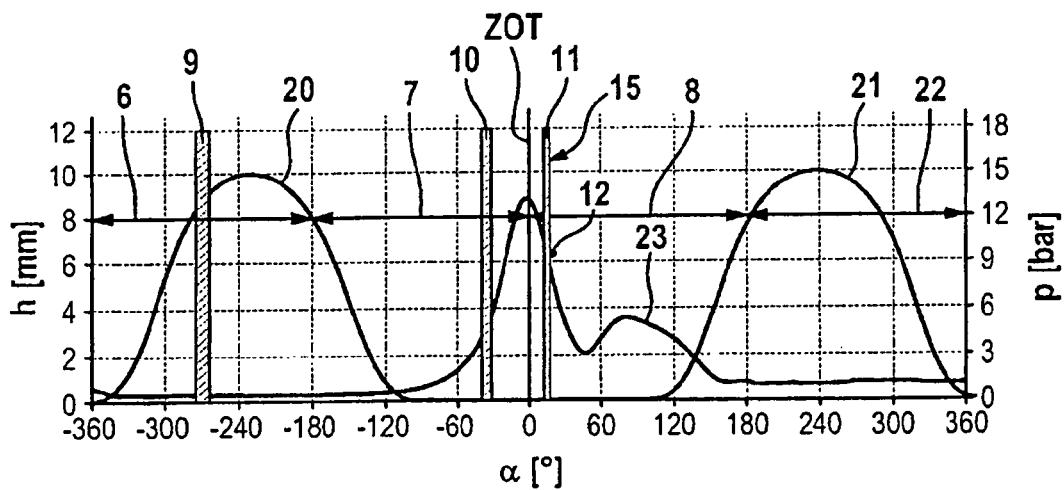
FIG. 2 is a diagram of the fuel injections occurring at different crank angles in accordance with the procedure of FIG. 1.

In the first inventive method for cold-running operation of the spark-ignition internal combustion engine shown here, which method extends over the time period from the cold start, with the exhaust gas catalytic converter 1, cylinder 4, piston 17 and cylinder head 19 not yet at operating temperature, at least to that time at which the exhaust gas catalytic converter 1 has reached its light-off temperature, a total of 3 injections of fuel 2 are performed in each cycle by the injector 3, said injections being described in more detail in conjunction with FIG. 2. FIG. 2 shows in this respect a diagram of various individual sequences of the first method according to the invention as a function of a crank angle $\alpha$ of a crank shaft (not illustrated) which predefines the axial position of the piston 17 in the cylinder 4 (FIG. 1). A crank angle $\alpha$ of 0° predefines a top dead center ZOT in which the interior of the cylinder contains a fuel/air mixture in which the inlet and outlet valves (not illustrated) are closed, and in which the piston 17 (illustrated in FIG. 1) has, in its axial position which comes closest to the cylinder head 19, compressed the fuel/air mixture located in the cylinder 4. In the region of the top dead center ZOT, the fuel/air mixture is ignited by means of the spark plug 5 (FIG. 1).

A first stroke of the 4-stroke method is an intake stroke 6 which extends over a crank angle range $\alpha$ of 360° to 180° before the top dead center ZOT. This is adjoined by a compression stroke 7 which extends over a crank angle range $\alpha$ from 180° to 0° before the top dead center ZOT. A working stroke 8 subsequently runs from the top dead center ZOT with a crank angle $\alpha$ of 0° to 180° which is adjoined by an outlet stroke 22 from 180° to 360° crank angle $\alpha$ after the top dead center ZOT. The end of the outlet stroke 22 at a crank angle $\alpha$ of 360° after the top dead center ZOT corresponds to the start of a subsequent intake stroke 6 at a crank angle $\alpha$ of 360° before the top dead center ZOT.

The inlet valves (not illustrated) carry out a valve stroke h corresponding to a curve 20 which for the most part extends over the intake stroke 6 and also partially into the compression stroke 7. Given a valve stroke h which is greater than 0 of the inlet valves, fresh air is sucked into the interior of the cylinder 4, if appropriate assisted by a charger (FIG. 1). The same applies to the discharging of exhaust gases from the cylinder 4, a valve stroke h of the outlet valves (not illustrated) being represented by a curve 21. Accordingly, the outlet valves are opened essentially over the outlet stroke 22, with the outlet valves already starting to open toward the end of the working stroke 8. When the outlet valves are opened, the exhaust gas which is discharged through the exhaust gas duct 18 (indicated in FIG. 1) and the exhaust gas catalytic converter 1 which is arranged therein.

Referring simultaneously to FIGS. 1 and 2, it is provided in accordance with the first inventive method to carry out a first injection of fuel 2 as an intake stroke injection 9 into the cylinder 4 during the intake stroke 6 by means of the injector 3. In the exemplary embodiment shown, in this context the intake stroke injection 9 is carried out in such a way that an at least approximately homogenous lean mixture 13 with an air/fuel ratio $\lambda 1$ of approximately 1.6 is produced in the cylinder 4. The intake stroke injection 9 occurs at a crank angle $\alpha$ of approximately 260° before the top dead center ZOT. The intake stroke injection 9 may be in this context an individual injection which takes place over a relatively long time period. Given a suitable embodiment of the injector 3, for example in piezo design, the intake stroke injection 9 can also be embodied as a multiple injection, in particular as a double injection or triple injection with short individual injections in a time period of a few milliseconds.

In the compression stroke 7 which follows the intake stroke 6, a second injection of fuel 2 is carried out as a compression stroke injection 10. In the exemplary embodiment shown, the compression stroke injection 10 occurs at a crank angle $\alpha$ of approximately 30° before the top dead center and is embodied as a single injection which is spread over time. A multiple injection can also be performed, in a way which is comparable to the intake stroke injection 9.

In the exemplary embodiment shown, the compression stroke injection 10 is embodied by means of the control unit 16 acting on the injector 3, in such a way that, within the lean mixture 13, a mixture cloud 14 which is relatively rich compared to the lean mixture 13 is formed. The mixture cloud 14 is embedded in the lean mixture 13 of the intake stroke injection 9 and has a combustible and ignitable fuel/air mixture with an air/fuel ratio $\lambda 2$ of less than 1.0. The spatially limited mixture cloud 14, which does not fill up the interior of cylinder 4, preferably does not reach as far as cold wall components of the internal combustion engine such as the cylinder 4, the piston 17 or the cylinder head 19 but extends only as far as the spark region of the spark plug 5.

After the intake stroke injection 9 and the compression stroke injection 10, a third injection of fuel 2 occurs in the form of a stratified injection 11 which is embodied in the shape of a jet in such a way that it is introduced into the mixture cloud 14 and in the process is moved directly past the spark region of the spark plug 5. The stratified injection 11 can also be embodied as a single injection or multiple injections corresponding to the intake stroke injection 9 or the compression stroke injection 10.

In contrast to the intake stroke injection 9 and the compression stroke injection 10, the time of the stratified injection 11 is not coupled to the crank angle $\alpha$ but rather to the chronological position of the ignition time 12. Depending on the rotational speed and/or the load of the internal combustion engine, the ignition time 12 can occur during the compression stroke 7 before the top dead center ZOT or thereafter during the working stroke 8. The ignition time 12 expediently occurs after the top dead center ZOT and in particular in a crank angle range $\alpha$ of 0° to 35°, preferably of 15° to 30° after the top dead center ZOT. The ignition time 12 is shown here by way of example at a crank angle $\alpha$ of approximately 20°. If the stratified injection 11 is embodied as a multiple injection, it may also be expedient to perform an individual injection just before the ignition time 12 and to perform one just after said ignition time 12.

The stratified injection 11 is just before the ignition time 12 in terms of timing, and in this respect an end 15 of the stratified injection 11 is illustrated here by way of example as occurring at the ignition time 12. The end 15 of the injection occurs expediently in a range of 0° to 10° of the crank angle α before the ignition time 12. The late ignition 12, occurring after the top dead center ZOT, occurs when the cylinder pressure p (represented by a curve 23) drops.

The stratified injection 11 produces a fuel/air mixture which is enriched locally in the region of the spark plug 5 and can easily and reliably be ignited in the direct chronological vicinity despite the relatively late ignition time 12. The only very small fuel quantity of the stratified injection 11 compared to the intake stroke injection 9 and the compression stroke injection 10 serves here merely to provide a reliable ignition and otherwise contributes to the rich fuel/air ratio $\lambda 2 < 1.0$ in the mixture cloud 14. All the injections 9, 10, 11 are matched to one another in terms of their respective quantity of fuel 2 in such a way that a lean mixture does indeed occur locally in the lean mixture 13 of the intake stroke injection 9 and a rich mixture occurs in the mixture cloud 14. However, averaged over the total volume of the interior of the cylinder, an overall air/fuel ratio $\lambda$ is formed which is stoichiometric ($\lambda=1$) or slightly lean ($\lambda<1$). The overall air/fuel ratio $\lambda$ preferably occurs in a range between inclusive 1.0 and inclusive 1.05.

As a result of the stratified injection 11, a reliable ignition of the mixture cloud 14 is ensured even at a very late ignition time 12 and when the components of the internal combustion engine are cold, while the homogenous lean mixture 13 avoids excessive accumulation of fuel 2 on cold engine components. At the same time, the total quantity of fuel/air mixture in the cylinder 4 is not completely burnt when the outlet valves are opened in accordance with the curve 21, in particular in the region of the lean mixture 13. Unburnt components are conducted through the exhaust gas duct 18 and the exhaust gas catalytic converter 1. The approximately stoichiometric or slightly lean overall air/fuel ratio $\lambda$ permits, without further measures, a thermal post-combustion in the region of the exhaust gas duct 18 between the cylinder head 19 and the exhaust gas catalytic converter 1 and also in the exhaust gas catalytic converter 1 itself, as a result of which the latter is heated very rapidly from the cold state to the so-called light-off temperature at which the exhaust gas catalytic converter can generate its catalytically converting effect.

By means of the control unit 16, the injection quantities of the compression stroke injection 10 and/or of the stratified injection 11 are open-loop or closed-loop controlled in particular in the region of the exhaust gas catalytic converter 1 in a way which is adapted to the temperature which rises during the cold-running operation. Furthermore, open-loop or closed-loop control of the times of the compression stroke injection 10 and/or of the ignition time 12 and of the stratified injection 11 which is coupled to the ignition time 12 is also carried out by means of the control unit 16. The abovementioned open-loop or closed-loop control can also relate to the sequence of multiple injections for forming the individual injections 9, 10, 11. In particular there is provision for the compression stroke injection 10 to be moved continuously from a crank angle α of approximately 30° before the top dead center ZOT to an earlier time up to a crank angle α of approximately 210° to 230° before the top dead center ZOT. At the same time, the initially late ignition time 12 and the stratified injection 11 which is coupled thereto are moved to an earlier time, in particular before the top dead center ZOT.

As an assisting measure for the thermal post-combustion it is also possible for secondary air to be blown into the exhaust gas duct 18, which further speeds up the heating up of the exhaust gas catalytic converter 1. Likewise, it may be expedient to provide, after the stratified injection 11 and the ignition time 12, an additional injection which is coupled in terms of operating point either to the ignition time 12 or to the crank angle α, with which additional injection additional chemical energy is introduced into the exhaust gas and therefore into the exhaust gas catalytic converter 1 in order to heat up the latter more quickly.

Figure 3:
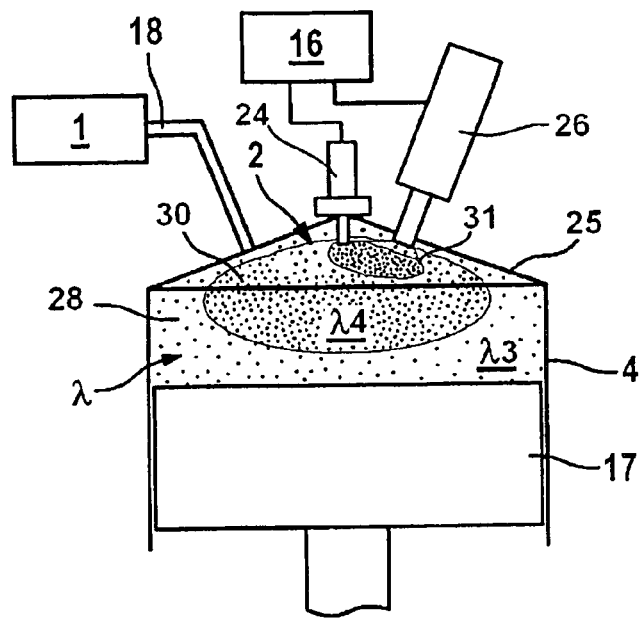
FIG. 3 is a schematic illustration of an internal combustion engine cylinder with an injector which is arranged laterally offset in a cylinder head, a spark plug which is arranged centrally in the cylinder head, a control unit and an exhaust gas catalytic converter, the cylinder being filled differently with a fuel/air mixture in different regions according to a second method according to the invention.

FIG. 3 is a schematic illustration of a detail of a spark-ignition, direct-injection 4-stroke internal combustion engine in the region of the cylinder 4. The second method according to the invention is shown using the example of the cylinder 4 which is shown here. Identical or identically acting components or method steps are characterized here by the same reference symbols of the first inventive method according to FIGS. 1 and 2. In contrast to the internal combustion engine according to FIG. 1, a spark plug 24 is arranged centrally in the cylinder head 25 and an injector 26 is arranged laterally displaced from the center of the cylinder head 25. The internal combustion engine may have one or more cylinders 4, each with a piston 17 which is moved cyclically up and down therein. The cylinder 4 is closed off in its longitudinal direction at the end opposite the piston 17 by the cylinder head 25, the interior of the cylinder 4 being bounded in the opposite direction by the piston 17. The up and down movement of the piston 17 and the control times, coupled thereto, of inlet valves and outlet valves (not illustrated) produce a total of four strokes of the method (described in conjunction with FIG. 4) of the internal combustion engine which follow one another in a cyclical sequence.

In order to inject fuel 2 into the cylinder 4, the injector 26 is activated by means of the schematically indicated control unit 16. The injector 26 which is arranged laterally in the cylinder head 25 is arranged near to the inlet valve or between the inlet valves. The fuel 2 which is injected into the cylinder 4 forms, together with a fresh air volume which is sucked in the intake stroke 6 (FIG. 4), a fuel/air mixture which is ignited at a suitable time by the spark plug 24 which is arranged centrally in the cylinder head 25. According to the schematic illustration in FIG. 3, the control unit 16 controls the fuel injection by the injector 26, and also the ignition by the spark plug 24. The ignition initiates the combustion of the fuel/air mixture in the cylinder 4. The exhaust gas which is produced is conducted out of the cylinder 4 through the exhaust gas duct 18 via the outlet valves and is passed through the exhaust gas catalytic converter 1 for treatment. The exhaust gas catalytic converter 1 can be of any desired suitable design and in the exemplary embodiment shown it is a three-way end-wall catalytic converter.

Figure 4:
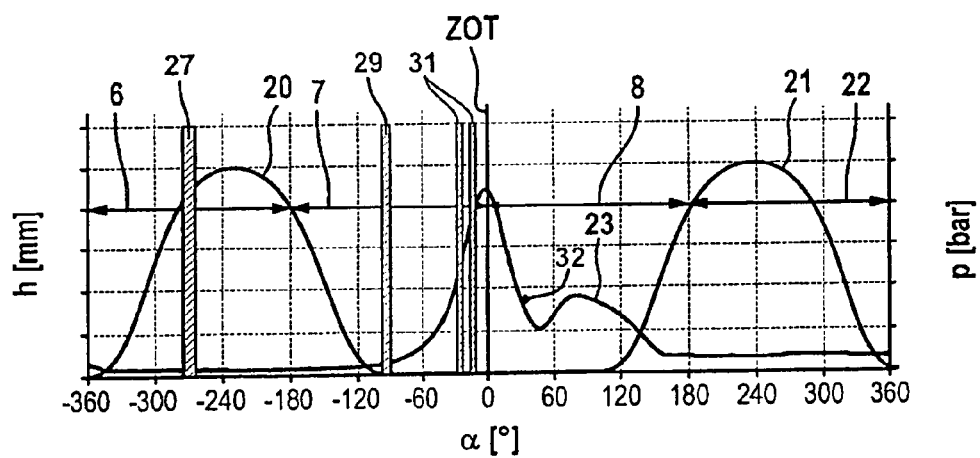
FIG. 4 is a diagram of the fuel injections occurring at different crank angles in accordance with the procedure of FIG. 3.

In the second method according to the invention for cold-running or warm-up operation of the spark-ignition internal combustion engine shown here, which method extends over the time period from the cold start with the exhaust gas catalytic converter 1, cylinder 4, piston 17 and cylinder head 25 which is not yet at operating temperature at least up to that time at which the exhaust gas catalytic converter 1 has reached its light-off temperature, a total of three injections of fuel 2 are performed by means of the injector 26, which injections are described in more detail in conjunction with FIG. 4. FIG. 4 shows in this respect a diagram of various individual sequences of the second inventive method as a function of the crank angle α of a crankshaft (not illustrated) which defines the axial position of the piston 17 in the cylinder 4 (FIG. 3). A crank angle α of 0° defines a top dead center ZOT in which the interior of the cylinder contains a fuel/air mixture in which the inlet and outlet valves (not illustrated) are closed, and in which the piston 17 (illustrated in FIG. 3) in its axial position which comes closest to the cylinder head 25 has compressed the fuel/air mixture located in the cylinder 4. In the region of the top dead center ZOT, the fuel/air mixture is ignited by the spark plug 24 (FIG. 3).

A first stroke of the 4-stroke method is the intake stroke 6 which extends over a crankshaft range a of 360° to 180° before the top dead center ZOT. The following compression stroke 7 runs over a crank angle range α of 180° to 0° before the top dead center ZOT. The working stroke 8 then runs from the top dead center ZOT with a crank angle α of 0° to 180°, which is followed by the working stroke 22 of the 180° to 360° crank angle α after the top dead center ZOT. The end of the outlet stroke 22 at a crank angle α of 360° after the top dead center ZOT corresponds to the start of a subsequent intake stroke 6 at a crank angle α of 360° before the top dead center ZOT.

The inlet valves (not illustrated) carry out a valve stroke h corresponding to the curve 20 which extends for the most part over the intake stroke 6 and also partially into the compression stroke 7. During a valve stroke h of the inlet valves which is greater than 0, fresh air, if appropriate assisted by a charger, is sucked into the interior of the cylinder 4 (FIG. 3). The same applies to the discharging of exhaust gases from the cylinder 4, in which context a valve stroke h of the outlet valves (not illustrated) is illustrated by the curve 21. Accordingly, the outlet valves are essentially opened over the outlet stroke 22, with the opening of the outlet valves already starting toward the end of the working stroke 8. When the outlet valves are opened, the exhaust gas which is produced is conducted through the exhaust gas duct 18 (indicated in FIG. 3) and the exhaust gas catalytic converter 1 which is arranged downstream.

Referring simultaneously to FIGS. 3 and 4, the second inventive method provides for a first injection of fuel 2 to be carried out as an intake stroke injection 27 into the interior of the cylinder 4 in the intake stroke 6 by means of the injector 26. In the exemplary embodiment shown, the intake stroke injection 27 is embodied here in such a way that an at least approximately homogenous lean mixture 28 with an air/fuel ratio λ3 of 2 to 3 is produced in the cylinder 4. The intake stroke injection 27 occurs at a crank angle α of 330° to 200° before the top dead center ZOT. For example, in FIG. 4 the intake stroke injection 27 is shown at a crank angle α of approximately 270°. The intake stroke injection 27 may be here an individual injection which takes place over a relatively long time period. Given a suitable embodiment of the injector 26, for example with a piezo design, the intake stroke injection 27 can also be embodied as a multiple injection, in particular as a double injection or triple injection with short individual injections in a time period of a few milliseconds.

In the compression stroke 7 which follows the intake stroke 6, a second injection of fuel 2 is carried out as a compression stroke injection 29 which occurs at a crank angle α of 330° to 200° before the top dead center ZOT. In the exemplary embodiment shown, the compression stroke injection 29 is at a crank angle α of approximately 95° before the top dead center and is embodied as an individual injection which is distributed over time. A multiple injection cannot have been performed, in a way which is comparable to the intake stroke injection 27.

In the exemplary embodiment shown, the compression stroke injection 29 is carried out by means of the control unit 16 which acts on the injector 26, in such a way that, within the lean mixture 28, a mixture cloud 30 which is relatively rich compared to the lean mixture 28, is formed. The mixture cloud 30 is embedded in the lean mixture 28 of the intake stroke injection 27 and has a combustible and ignitable fuel/air mixture with an air/fuel ratio λ4 of less than 1.0. The spatially limited mixture cloud 30 which does not fill up the interior of the cylinder 4 preferably does not reach cold wall components of the internal combustion engine such as the cylinder 4, the piston 17 or the cylinder head 25 but extends as far as the radial region of the spark plug 24. In particular, the early compression stroke injection 29 in the first half of the compression stroke 7 avoids wetting the piston 17 with fuel.

After the intake stroke injection 28 and the compression stroke injection 30, a third injection of fuel 2 occurs in the form of a stratified injection 31 which is in the shape of a jet introduced into the mixture cloud 30 so that it extends directly to the spark region of the spark plug 24. The stratified injection 31 occurs at a crank angle α of 50° to 10° before the top dead center. The stratified injection 31 comprises at least one individual injection which has a quantity which corresponds essentially to the minimum injection quantity of the injector 26. The stratified injection 31 can be divided into a plurality of individual injections whose respective quantities are essentially the same. By dividing up the stratified injection 31 into a plurality of injections, the individual injections correspond approximately to the minimum injection quantity of the injector 26. The penetration depth of the ejected fuel is limited by the small fuel quantity of the respective injections, with the result that the fuel reaches only the spark region of the spark plug 24, which avoids wetting of the wall components of the internal combustion engine and results in a rich, ignitable mixture in the spark region of the spark plug 24. In the exemplary embodiment shown, the stratified injection 31 is divided into two successive injections.

Depending on the rotational speed and/or load of the internal combustion engine, an ignition time 32 after the top dead center ZOT can occur in the working stroke 8 in a crank angle range of 0° to 40°. By way of example, the ignition time 32 is shown here at a crank angle α of approximately 30°.

The late ignition 12 after the top dead center ZOT occurs when the cylinder pressure p (illustrated by a curve 23) is dropping.

The stratified injection 31 produces a fuel/air mixture which is enriched locally in the region of the spark plug 5 and which can be easily and reliably ignited in chronological order despite the relatively late ignition time 32. The fuel quantity of the stratified injection 31 which has a proportion of 10% to 20% of the total injection quantity of all the injections 27, 29, 31 and is a very small quantity compared to the intake stroke injection 27 with a proportion of 30% to 60% of a total injection quantity of all the injections 27, 29, 31, and compared to the compression stroke injection 29 with a proportion of 20% to 50% of a total injection quantity of all the injections 27, 29, 31, serves here merely to promote reliable ignition and otherwise contributes to the rich air/fuel ratio λ4<1.0 in the mixture cloud 30.

All the injections 27, 29, 31 are matched to one another in terms of their respective amount of fuel 2 in such a way that a relatively lean mixture is produced locally within the lean mixture 28 of the intake stroke injection 27 and a rich mixture area 31 is produced in the mixture cloud 30. However, averaged over the total volume of the interior of the cylinder, an overall air/fuel ratio λ is formed which is stoichiometric (λ=1) or slightly lean (λ<1). The overall air/fuel ratio λ is preferably in a range between inclusive 1.0 and inclusive 1.05.

The stratified injection 31 ensures reliable ignition of the mixture cloud 30 even when the ignition time 32 is very late and when the components of the internal combustion engine are cold, while the homogenous lean mixture 28 avoids excessive accumulation of fuel 2 on cold engine components. At the same time, the total quantity of fuel/air mixture in the cylinder 4 is not completely burnt when the outlet valves open in accordance with the curve 21, in particular in the region of the lean mixture 28. Unburnt parts are conducted through the exhaust gas duct 18 and the exhaust gas catalytic converter 1. The approximately stoichiometric or slightly lean global air/fuel ratio λ permits, without further measures, thermal post-combustion in the region of the exhaust gas duct 18 lying between the cylinder head 25 and the exhaust gas catalytic converter 1, as well as also in the exhaust gas catalytic converter 1 itself, as a result of which the latter is heated very rapidly from the cold state to the so-called light-off temperature at which the exhaust gas catalytic converter can effectively operate.

By means of the control unit 16, the injection quantities of the intake stroke injection 27 and/or of the compression stroke injection 29 and/or of the stratified injection 31 are open-loop or closed-loop controlled, in particular in the region of the exhaust gas catalytic converter 1, in a way which is adapted to the temperature which rises during the cold-running operation. Furthermore, open-loop or closed-loop control of the ignition time 32 is carried out by means of the control device 16. The abovementioned open-loop or closed-loop control can also relate to the sequence of multiple injections for forming the individual injections 27, 29, 31.

As an assisting measure for the thermal post-combustion it is also possible for secondary air to be blown into the exhaust gas duct 18, as a result of which the heating of the exhaust gas catalytic converter 1 is accelerated further. Likewise, it may be expedient, after the stratified injection 31 and the ignition time 32, to provide an additional injection which is coupled either to the ignition time 32 or to the crank angle α and with which additional chemical energy is introduced into the exhaust gas and therefore into the exhaust gas catalytic converter 1 in order to heat it up more quickly.

What is claimed is:

1. A method for cold-running and warm-up operation of a spark-ignition, direct-injection 4-stroke internal combustion engine having a cylinder head with an exhaust duct (18) including an exhaust gas catalytic converter (1), and a fuel injection system for the injection of fuel (2) into a cylinder (4) of the internal combustion engine via an injector (3, 26) and an injection system with a spark plug (5, 24) arranged in the cylinder head, comprising the steps of:

injecting a first injection amount of fuel (2) into the cylinder (4) during an intake stroke (6) as an intake stroke injection (9) so as to form a lean, combustible but non-ignitable lean mixture (13) in the whole cylinder (4) of the engine;

injecting a second injection amount of fuel (2) during a compression stroke (7) following the intake stroke (6), as a compression stroke injection (10, 29) in which a combustible and ignitable fuel/air mixture is produced in part of the non-ignitable lean mixture (13) previously established in the cylinder;

subsequently injecting a third injection amount of fuel (2) in the form of a stratified injection (11, 31) close in terms of timing to an ignition time (12, 32) so as to form in the combustion and ignitable fuel/air mixture a fuel/air mixture cloud (11, 31) which is enriched locally in the region of the spark plug (5, 24), and igniting said locally enriched fuel/air mixture cloud (11, 31) by the spark plug (3, 26).

2. The method as claimed in claim 1, wherein the intake stroke injection (9, 27) is carried cut in such a way that an at least approximately homogenous lean non-ignitable mixture (13, 28) is produced in the cylinder (4).

3. The method as claimed in claim 2, wherein the homogenous lean mixture (13, 28) has an air/fuel ratio ($\lambda 1$, $\lambda 3$) of between 1.6 and 3.

4. The method as claimed in claim 1, wherein the fuel mixture cloud (14, 30) formed with the compression stroke injection (10) within the homogeneous lean mixture (13, 28) is richer than the mixture formed with the intake stroke injection.

5. The method as claimed in claim 4, wherein the richer mixture cloud (14, 30) has an air/fuel ratio ($\lambda 2$, $\lambda 4$) of less than 1.0.

6. The method as claimed in claim 1, wherein the overall air/fuel ratio ($\lambda$) which is averaged over the cylinder volume and is obtained from all the injections (9, 10, 12, 27, 29, 31) is at least 1.0 and, in particular, from 1.0 to 1.05.

7. The method as claimed in claim 1, wherein at least one of the intake stroke injection (9, 27), the compression stroke injection (10, 29) and the stratified injection (11, 31) is carried out as a multiple injection.

8. The method as claimed in claim 1, wherein the intake stroke injection (9, 27) occurs at a crank angle (α) of 330 to 260° before a top dead center (ZOT).

9. The method as claimed in claim 1, wherein the compression stroke injection (10, 29) occurs at a crank angle (α) of approximately 150 to 30° before the top dead center (ZOT).

10. The method as claimed in claim 1, wherein the stratified injection (11, 31) is performed in terms of timing based on the ignition time (12, 32).

11. The method as claimed in claim 10, wherein the ignition time (12, 32) occurs after the top dead center (ZOT) and in a crank angle range (α) of 0° to 40°, after the top dead center (ZOT).

12. The method as claimed in claim 11, wherein the stratified injection (11) as ended at the ignition time (12).

13. The method as claimed in claim 1, wherein the injection quantities of at least one of the suction stroke injection (27), the compression stroke injection (29) and of the stratified injection (31) and the ignition time (32) are controlled by means of a control unit (16) as a function of the operating temperature reached in the exhaust gas catalytic converter (1).

14. The method as claimed in claim 1, wherein the timing of the compression stroke injection (10) in combination with the timing of the ignition (12) and also the timing of the stratified injection (11) which is coupled to the ignition timing (12) are controlled by the control unit (16) as a function of the operating temperature reached in the exhaust gas catalytic converter (1).

15. A method as claimed in claim 1, wherein the fuel injector (26) is arranged laterally displaced from the center of the cylinder head (25) and the fuel mixture is externally ignited by means of a spark plug (24) which is arranged centrally in the cylinder head (25).

16. A method as claimed in claim 1, wherein the fuel injector (3) is arranged in the center of the cylinder head (19) and the fuel mixture is externally ignited by means of a spark plug (5) which is arranged in the cylinder head (19) laterally displaced from the fuel injector (3).

17. The method as claimed in claim 1, wherein the stratified injection (11, 31) comprises at least one individual injection which has a fuel quantity which corresponds essentially to the minimum injection quantity, the injector (3, 26) is capable of providing.

18. The method as claimed in claim 1, wherein the stratified injections (11,31) occur in a crank angle range (α) of 50° to 10° be before the top dead center (ZOT).

* * * * *